(12) United States Patent
Sakai et al.

(10) Patent No.: US 6,197,371 B1
(45) Date of Patent: *Mar. 6, 2001

(54) BRAKE BAND HAVING AN IMPROVED INITIAL FRICTION COEFFICIENT

(75) Inventors: Masaki Sakai; Toshiaki Wakisaka; Yoshihisa Harada, all of Shizuoka (JP)

(73) Assignee: NSK-Warner Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/763,294

(22) Filed: Dec. 10, 1996

(30) Foreign Application Priority Data

Dec. 11, 1995 (JP) ................................. 7-345395

(51) Int. Cl.$^7$ ...................................... B05D 3/12
(52) U.S. Cl. .................. 427/238; 427/277; 427/287; 427/370; 188/77 R
(58) Field of Search ................... 427/230, 238, 427/239, 356, 358, 370, 277, 287; 188/77 R, 77 W

(56) References Cited

U.S. PATENT DOCUMENTS

| 4,537,823 | * | 8/1985 | Tsang et al. | 428/308.4 |
| 5,135,082 | * | 8/1992 | Umezawa et al. | 188/77 W |
| 5,823,314 | * | 10/1998 | Suzuki et al. | . |

FOREIGN PATENT DOCUMENTS 7-224175   8/1995   (JP) .

OTHER PUBLICATIONS

"Hawley's Condensed Chemical Dictionary", 13$^{th}$ Ed, Edited by R. J. Lewis Sr, p. 210, 1997.*

* cited by examiner

Primary Examiner—Fred J. Parker
(74) Attorney, Agent, or Firm—Sughrue, Mion, Zinn, Macpeak & Seas, PLLC

(57) ABSTRACT

A brake band formed by pressing a smooth hot plate or hot drum heated to a temperature of 350 to 550° C. on a surface of the frictional material made of a fiber component, a filler, a friction adjustment agent and a thermosetting resin on a strap for 1 to 5 seconds before or after the frictional material is fixed.

9 Claims, 2 Drawing Sheets

BRAKE BAND HAVING AN IMPROVED INITIAL FRICTION COEFFICIENT

BACKGROUND OF THE INVENTION

1. Field of the Invention

The present invention relates to a brake band for use in an automatic transmission or the like in which initial frictional characteristic is improved and durability is provided, and producing method thereof.

2. Description of the Related Art

In a conventional wet frictional engagement plate, a frictional material is fixed on a surface of a core metal. The frictional material consists of: a fiber base such as natural f pulp fibers, organic synthetic fibers, or the like; a filler such as diatom earth or the like; a friction adjustment agent such as cashew resin or the like; and thermosetting resin. Therefore, the frictional surface is slightly uneven because of interweave of the fibers so that there is such a tendency that the friction coefficient is small in an initial stage of use because of presence of the thermosetting resin attached on the fiber surface, and the friction coefficient becomes larger because the frictional surface gets used with passage of time of use.

For example, in FIG. 1, the ordinate and abscissa represent the friction coefficient and the number of use (number of cycles) respectively and a dotted line B shows a change of the friction coefficient of the conventional frictional plate. It is found from the drawing that the friction coefficient is small in the initial stage of use and becomes large gradually with the passage of time of use and that the value of the friction coefficient is not stabilized until about 100 cycles.

In the case of a vehicle having an automatic transmission, therefore, there has been such a disadvantage that the running time of the transmission is shortened because the transmission is returned when the sense of driving changes due to to a change in the friction coefficient from an initial state.

Having the foregoing disadvantage, the conventional frictional material has such a problem that the friction coefficient changes between the beginning of use and after use for a certain period of time to thereby cause a large change in the performance of transmission when the frictional material is used as a brake band of an automatic transmission.

Then, in order to eliminate the disadvantage, there have been proposed various methods. For example, another slidable member, which is slidable with respect to a frictional plate, is compressedly contacted to the frictional plate, and is slid for a predetermined time to increase the temperature of the frictional surface of the frictional plate so as to harden an unhardened resin component on the frictional surface to thereby stabilize the friction coefficient.

Although the friction coefficient can be stabilized in this method, it requires a certain amount of time for running-in in oil with a partner member in order to obtain predetermined performance, and there arises a problem in workability which thereby causes an increase of the cost.

On the other hand, a surface portion of a frictional material is irradiated with laser light to burn out or partly thermally decompose an organic binder to thereby convert at least a part of the organic binder to carbon (i.e, to carbonizer) so as to remove excessive organic binder to thereby prevent initial reduction of the friction coefficient.

Further, there has been proposed such a method that a hot plate heated to 600° C. is pressed on a frictional material to carbonize a binder in the frictional material.

In the foregoing means, although a frictional material is heated to a temperature not lower than the temperature of decomposition of resin to carbonize the resin so that the friction coefficient is stabilized, there has been such a significant problem that the strength of the frictional material is reduced or the durability thereof is reduced by abrasion of a surface carbonized-layer or the like.

SUMMARY OF THE INVENTION

It is an object of the present invention to provide a brake band in which the initial friction coefficient is stabilized and reduction of the durability is prevented without carbonization the thermosetting resin.

A brake band according to the present invention is produced by the method comprising the steps of: fixing a wet frictional material comprising a fiber component, a filler, a friction adjustment agent and thermosetting resin; and pressing heating means having a smooth surface at a temperature in the range of 350° C. to 550° C. on a surface of the frictional material for 1 to 5 seconds to smooth the surface without carbonizing the thermosetting resin.

In the brake band according to the present invention, auto the frictional material is subjected to the foregoing surface treatment. Therefore, not only the friction coefficient is stabilized from the beginning of use but also the frictional material has durability.

DETAILED DESCRIPTION OF THE INVENTION

Detailed description of the present invention will be described with reference to the accompanying drawings as follows.

In the present invention, the brake band is obtained through surface treatment in a manner so that before or after a wet frictional material consisting of a fiber component, a filler, a friction adjustment agent, and a thermosetting resin is fixed on a strap of the brake band, a smooth hot plate or hot drum heated to a temperature of 350 to 550° C. (perferably 400 to 500° C.) is pressed on a surface of the wet frictional material for 1 to 5 seconds so as to smooth the surface without carbonizing the thermosetting resin.

In the frictional surface, the initial friction coefficient is proportional to the actual contact area with a partner member and inversely proportional to the quantity of the thermosetting resin attached on fibers on the surface.

When the thermosetting resin which has been set by heating is further heated, the molecular structure gradually changes into a carbonized structure finally.

When the thermosetting resin, for example, phenol resin, to be used according to the present invention is treated by using a hot plate heated to 600° C. or more, the thermosetting resin is carbonize to thereby cause a problem in durability or abrasion resistance.

Accordingly, in the present invention, a smooth hot plate or hot drum heated to in a range of from 350 to 550° C. which is a temperature slightly lower than the temperature at which the thermosetting resin is changed into a carbonized structure by thermal decomposition is pressed on the frictional material for 1 to 5 seconds so that resin projected from the surface of the frictional material is made smooth and the actual contact area with a partner member is increased. As a result, the friction coefficient is higher from the beginning and can be maintained in a state where it is stabilized with less change as time passes.

Further, when the heat treatment temperature is not higher than 350° C., the softness of the thermosetting resin on the surface cannot be obtained in a short time or the softness is low so that sufficient effects cannot be created.

When treatment is performed at a temperature higher than 550° C., on the contrary, decomposition or carbonization of the thermosetting resin and fibers on the surface is advanced so that the strength of the frictional material is reduced and the durability and the abrasion-resistance deteriorate.

It is preferable that the surface roughness of a hot plate to be pressed on the frictional material according to the present invention is selected to be 5 S or less and the pressure is selected to be 3 to 10 kg/cm$^2$.

Figure 2:
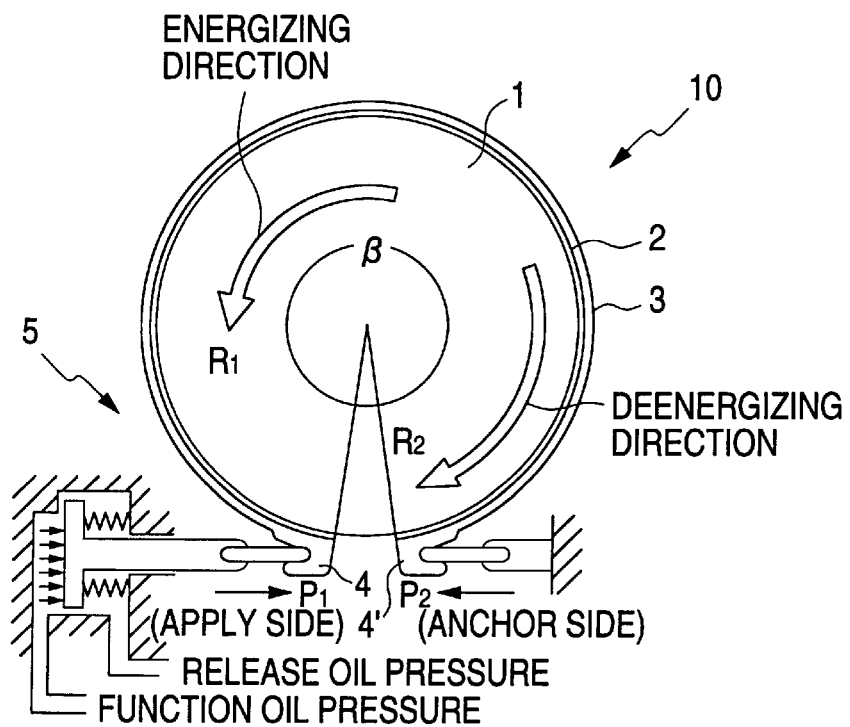
FIG. 2 is a view for explaining the fundamental configuration of the brake band.

FIG. 2 is a view for explaining the fundamental configuration of a brake band. A brake band 10 is configured such that a frictional material 2 is stuck on an inner surface of a strap 3 such as a thin steel plate or the like so as to surround a drum 1. Reference numeral 4 designates a bracket on a side (referred to as an apply side) for applying braking pressure (oil pressure $P_1$ in the drawing ) to the brake band; 4', a bracket on a fixed side (an anchor side); and 5, an oil pressure device.

The direction (of an arrow $R_1$) in the case where the drum 1 is rotating from the anchor side to the apply side is called an energizing direction (or a leading direction) and the reverse direction (of an arrow $R_2$) is called deenergizing direction (or a trailing direction). As described above, in the conventional frictional material of the brake band, the friction coefficient is small before use and is increased during use of the frictional material to thereby generate a large change in the performance of the transmission.

According to the present invention, before or after a wet frictional material made of a fiber component, a filler, a friction adjustment agent, and thermosetting resin is fixed on a strap, a smooth hot plate or hot drum heated to a temperature of 350 to 550° C. which is a value slightly lower than the temperature at which the thermosetting resin changes into a carbonized structure by thermal decomposition is pressed on the surface of the wet frictional material for 1 to 5 seconds so that resin projected from the surface of the frictional material is made smooth thereby to increase the actual contact area with a partner member. Accordingly, a high friction coefficient is obtained from the beginning, and the friction coefficient becomes stabilized with only a small change as time elapses.

Figure 1:
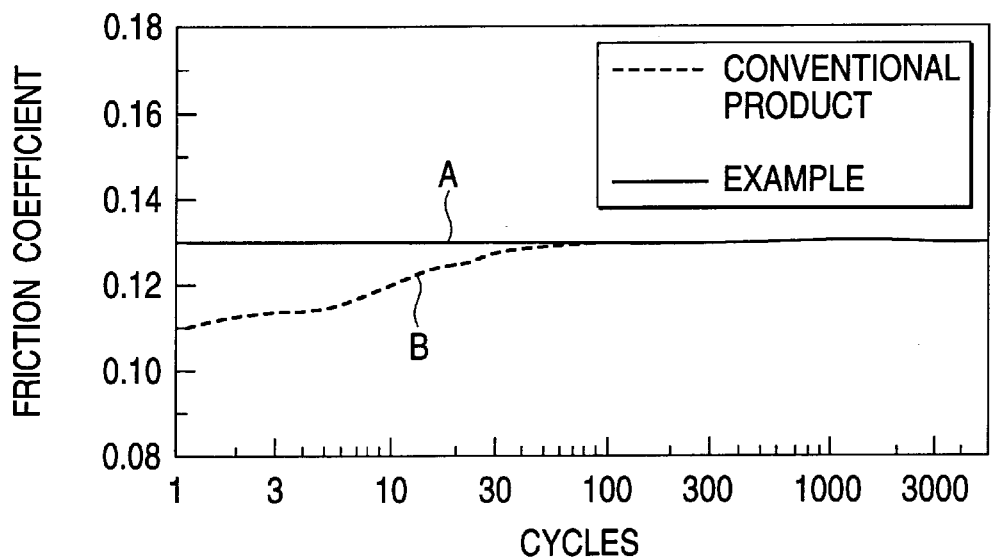
FIG. 1 is a view showing comparison of the change in the friction coefficient between a product in an example of the invention and the conventional product as the time passes.

In an example of the frictional material according to the present invention, the treatment temperature was 450° C.; the treatment time was 2 seconds; the treatment pressure was 6 kg/cm$^2$. FIG. 1 shows a comparison between the conventional product and a product in this embodiment. As described above, the ordinate and abscissa of FIG. 1 represent the friction coefficient and the number of times (cycle) of use respectively and the dotted line shows a change of the friction coefficient of the conventional product. A solid line A shows a change of the friction coefficient of the product in this example. The friction coefficient is stabilized from the beginning of use as shown by the solid line A in this example. In the conventional product, on the contrary, it is found from the drawing that the friction coefficient in the beginning of use low and is gradually increases with use so that it is stabilized at about 100 cycles.

Further, in the brake band, the contact surface pressure at the anchor or apply side is increased in accordance with the direction of rotation of the drum and the contact surface pressure at this portion has a large influence on the friction coefficient. Therefore, a smooth hot plate or hot drum heated to a temperature of 350 to 550° C. is pressed on the surface portion of the frictional material at this portion so that the same effects in the case where treatment is carried out over the whole of the frictional material can be obtained.

Figure 3:
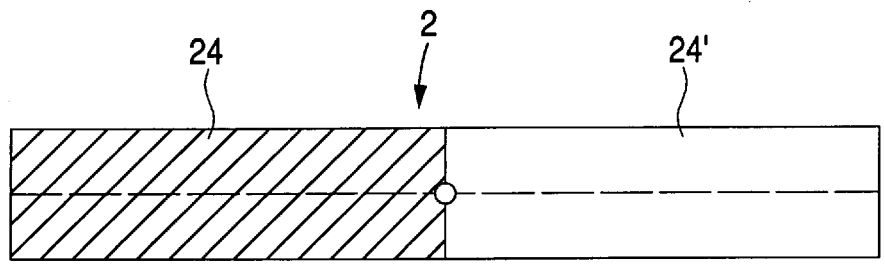
FIG. 3 is a view showing a case where a half portion of a frictional material on the apply side is subjected to smooth surface treatment.

FIG. 3 shows a case where a hatched portion 24 which is a half portion of the frictional material on the apply side was subjected to smooth surface treatment.

Figure 4:
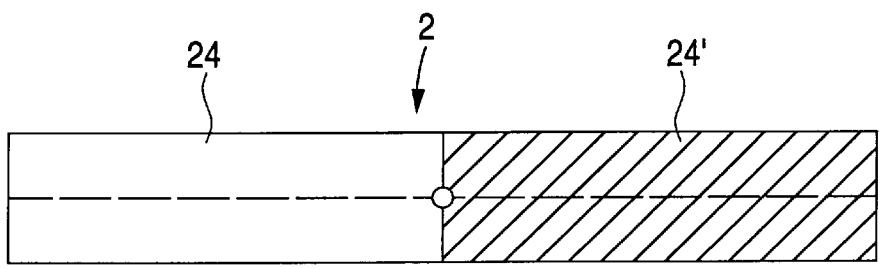
FIG. 4 is a view showing a case where a half portion of the frictional material on the anchor side is subjected to smooth surface treatment.

FIG. 4 shows a case where a hatched portion 24' which is a half portion of the same on the reverse side, that is, the anchor side, was subjected to smooth surface treatment.

Figure 5:
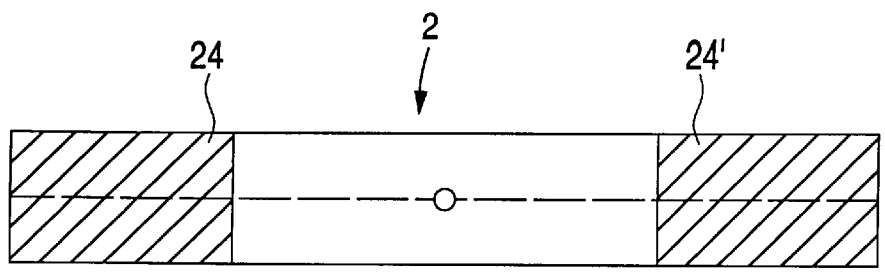
FIG. 5 is a view showing a case where both the portions in the vicinity of brackets on the apply and anchor sides are subjected to smooth surface treatment.

FIG. 5 shows a case where hatched portions 24 and 24' in the vicinity of the brackets on the apply and anchor sides were subjected to smooth surface treatment (in this case, any one of the portions may be treated).

In the brake band according to the present invention, the frictional material is subjected to the foregoing surface treatment. Therefore, not only the friction coefficient is stabilized from the beginning of use but also the frictional material has durability.

What is claimed is:

1. A brake band obtained by a process comprising the steps of:
    filing a frictional material comprising a fiber component, a filler, a friction adjustment agent and thermosetting resin to an inner surface of a cylindrical strap; and
    pressing a heating means having a smooth surface at a temperature in the range of 350° C. to 550° C. on a surface of said frictional material for 1 to 5 seconds to smooth said surface without carbonizing said thermosetting resin,
    wherein said heating means is applied to a substantially half portion of said frictional material.

2. A brake band according to claim 1, wherein in said pressing step, said heating means is pressed on a substantially half portion of said frictional material.

3. A brake band according to claim 1, wherein said half portion is disposed on an anchor side.

4. A brake band according to claim 1, wherein in said pressing step, said heating means is pressed on at least one of; an anchor side, and a supply side of said frictional material.

5. A brake band according to claim 1, wherein said pressing step is performed using a heating means having a surface roughness of 5 S or less.

6. A brake band according to claim 1, wherein in said pressing step said heating means presses the surface of said frictional material with a pressure in the range of 3 to 10 kg/cm$^2$.

7. A brake band according to claim 1, wherein said fixing step is performed before said pressing step.

8. A brake band according to claim 1, wherein said fixing step is performed after said pressing step.

9. A brake band according to claim 1 wherein said half portion is disposed on an apply side.

\* \* \* \* \*